United States Patent

[11] 3,551,602

[72] Inventors Norman W. Dawson;
William G. Jack, Ottawa, Ontario, Canada

[21] Appl. No. 722,617
[22] Filed Apr. 19, 1968
[45] Patented Dec. 29, 1970
[73] Assignee The Bell Telephone Co. of Canada
Montreal, Quebec, Canada

[54] DIVERSION CIRCUIT
10 Claims, 1 Drawing Fig.

[52] U.S. Cl. .................................................... 179/18
[51] Int. Cl. .................................................... H04m 3/54
[50] Field of Search .................................................... 179/27.24, 18.03, 18REG, 27.23, 18.3

[56] References Cited
UNITED STATES PATENTS
2,572,027 10/1951 Horwitz ........................ 179/18

*Primary Examiner*—Kathleen H. Claffy
*Assistant Examiner*—Douglas W. Olms
*Attorney*—Curphey & Erickson

ABSTRACT: The diversion circuit comprises a timing circuit which delays the connection of an incoming call to the information or repair desk for a predetermined time interval. If no further digits are received during that interval, a connection is made to the information or repair desk. However, if additional pulses are received during that interval because a calling subscriber dials an additional digit, the call is diverted to a tone supply, an announcement machine, or a special intercepting trunk circuit.

PATENTED DEC 29 1970 3,551,602
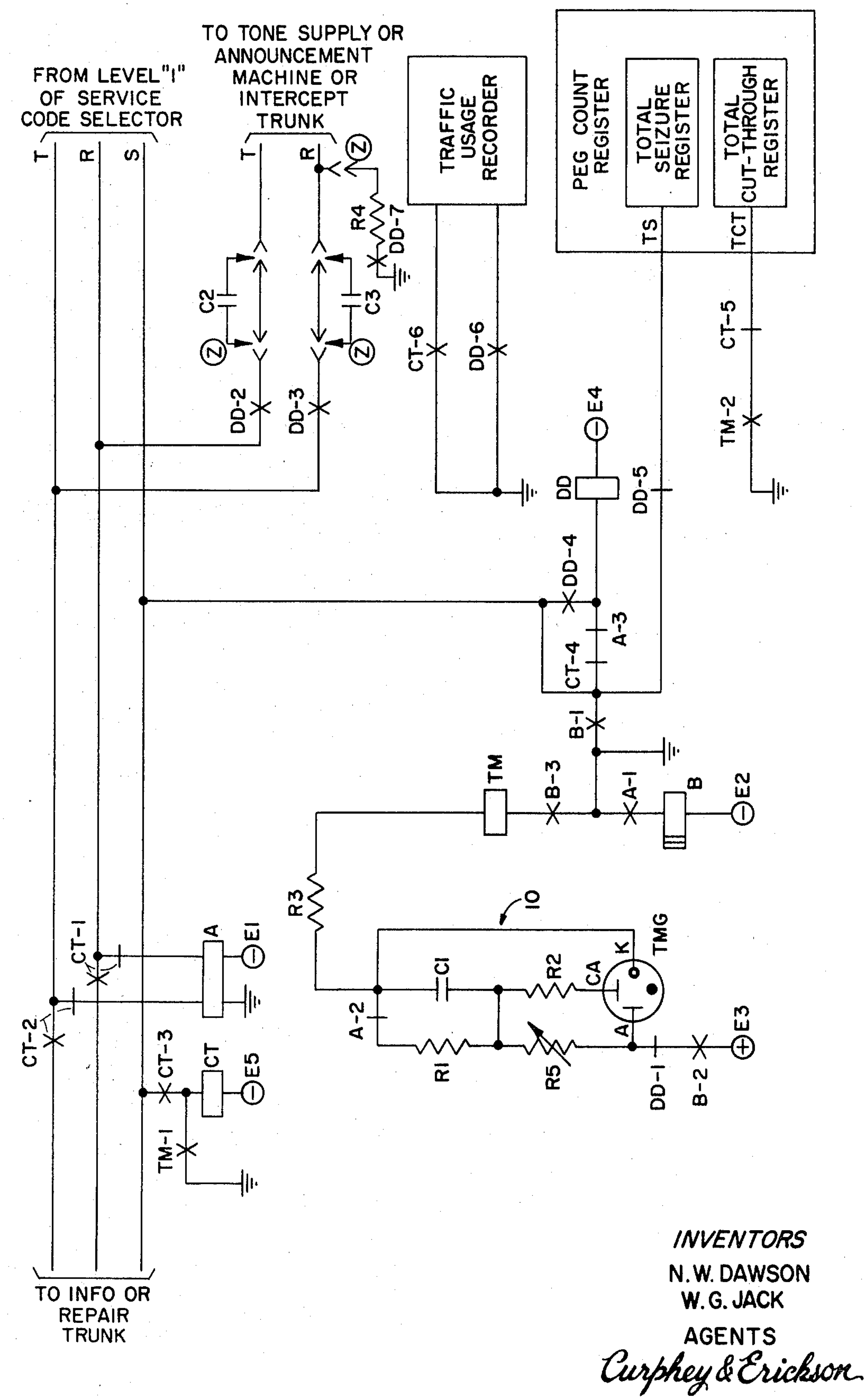
*INVENTORS*
N. W. DAWSON
W. G. JACK
AGENTS
Curphey & Erickson

DIVERSION CIRCUIT

This invention relates to the field of telephone communication and more particularly to a diversion circuit for use in automatic step-by-step switching systems.

In step-by-step offices where level 01 of the first selector serves new CAMA Code calls (1+), and new Service Code calls (411,611 etc.), the information or repair desk must handle many calls originated by customers dialing the old Service Code (11X) or the old CAMA Code (11+). It is common in these step-by-step offices to absorb the first digit dialled such that the first digit "X" of the new Service Code (X11) is absorbed by the first selector switch. As commonly known in the art, dialing of the first digit "1" steps the first selector to level "1" and seizes a Service Code selector. Dialing of the second digit "1" steps the Service Code selector to level "1" and signals the information or repair desk. This results in lost time to the operator and a poor service to the customers.

The present invention provides a circuit for diverting to a tone supply, an announcement machine, or to an intercepting trunk those calls from level "1" of Service Code selectors that are not actual listed Service Code calls as well as attempted CAMA calls preceded by the two digits (11+) of the old CAMA code. When a valid Service Code call (411,611 etc.) is dialled, the first digit (4, 6, etc.) is absorbed by the first selector and the subsequent two unit (1) digits are used to seize the diversion circuit.

The diversion circuit, in accordance with the present invention, comprises a timing circuit which delays the connection of an incoming call to the information or repair desk for a predetermined time interval. If no further digits are received during that interval, a connection is made to the information or repair desk. However, if additional pulses are received during that time interval the call is diverted to a tone supply, an announcement machine or a special intercepting trunk circuit. In a practical embodiment of the invention such circuit comprises a first means responsive to the seizure of the diversion circuit for energizing the timing circuit, a second means responsive to the timing circuit for connecting the call to the information or repair desk after a predetermined time interval, and a third means responsive to the reception of dialed pulses by the first means before completion of the timing interval for deenergizing the timing circuit and for diverting the call.

The invention will now be described with reference to the drawing which illustrates a preferred embodiment of the invention, such embodiment being in no way restrictive of the invention.

Referring to the drawing, when the trunk circuit is seized from level "1" of a Service Code selector, trunk relay A is energized from source E1 through an obvious circuit including contacts CT–1 and CT–2 of relay CT to be described later. The operation of relay A closes contacts A–1 to operate relay B through a circuit including potential source E2, relay B, operated contacts A–1 and ground. The operation of relay A also opens the discharge path of capacitor C1 at contacts A–2 and opens the operate path of relay DD at contacts A–3. The function of capacitor C1 and relay DD will be described later.

The operation of relay B closes contacts B–1 to place a ground on sleeve lead S to hold the preceding switch train operated as commonly known in the art. The operation of relay B also closes contacts B–2 and B–3 to start timing circuit 10. The closure of contacts B–1 also sets up an operate path for relay DD which does not operate at this time since contacts A–3 of relay A are opened.

The gas-tube timing circuit 10 is commonly known and a full description thereof may be found on pages 395—400 of The Design of Switching Circuits published by D. Van Nostrand Company, Incorporated. The timing action of the circuit starts when the high voltage E3 (about 130 volts) is applied thereto by the closure of contacts B–2 and B–3 combined with the removal of resistor R1 across capacitor C1 by the opening of contacts A–2. The characteristic of gas tube TMG is such that the main gap between the anode A and the cathode K does not break down at the voltage E3 until the control gap between control anode CA and the cathode K has broken down. The control gap breaks down when the voltage of capacitor C1 applied between the control anode CA and the cathode K reaches a critical level. For tubes normally used, this voltage is about 70 volts. The charging circuit for capacitor C1 is potential source E3, operated contacts B–2, closed contacts DD–1, variable resistor R5, capacitor C1, resistor R3, relay TM, operated contacts B–3 and ground. The capacitor voltage rises exponentially with time at a rate determined by variable resistor R5 and capacitor C1. The timing period of timing circuit 10 may be varied by varying resistor R5.

When the voltage across capacitor C1 has reached its critical value the gap between anode A and cathode K of tube TMG breaks down and relay TM is energized through the circuit comprising potential source E3, operated contacts B–2, contacts DD–1, tube TMG, resistor R3, relay TM, operated contacts B–3 and ground. It can be seen, therefore, that relay TM operates a predetermined time interval after the operation of relay B, such time interval being determined by resistor R5 and capacitor C1 and being set by variable resistor R5.

OPERATION ON A CUT-THROUGH BASIS

The energization of relay TM, upon completion of the timing interval, closes contacts TM–1 and operates relay CT. Relay CT locks operated through its own contacts CT–3 to the sleeve lead S which is grounded by operated contacts B–1. The operation of relay CT operates transfer contacts CT–1 and CT–2 and extends the tip and ring leads from the selector level to the associated trunk circuit. The operation of transfer contacts CT–1 and CT–2 also releases relay A. In addition, the operation of relay CT opens contacts CT–4 and opens the operate path of relay DD to be described later.

The release of relay A opens contacts A–1 and releases relay B which in turn opens contacts B–2 and B–3 to deenergize relay TM. In addition, the release of relay A closes contacts A–2 and discharges capacitor C1 through resistor R1. The subscriber is now cut through to the information or repair desk associated with this circuit.

When the subscriber hangs up, the associated trunk releases removing ground from the sleeve as commonly known in the art. This causes the release of relay CT. The release of relay CT releases contacts CT–1 and CT–2 and restores the diversion circuit to normal.

OPERATION ON A DIVERSION BASIS

If after seizure and before the operation of relay TM, one or more digits are received because a calling subscriber dials an old Service Code (11X) using a third digit "X" instead of the new Service Code number (X11), or dials a third digit "+" (for example, 112 followed by an area code number) of the new digit "1" access code number for direct distance dialing, relay A will release and operate following the pulses. On the first release of relay A, contacts A–3 will close, and relay DD will operate through the circuit comprising potential source E4, relay DD, released contacts A–3 and CT–4, and operated contacts B–1 and ground (relay B is a slow release relay which does not release between pulses when contact A–1 opens). The operation of relay DD closes contacts DD–2 and DD–3 to extend subscribers' tip and ring leads to a no-such-number tone supply, an announcement machine or an intercept trunk. When the subscribers' tip and ring leads are to be extended to a tone supply or an announcement machine, capacitor C2 and C3 are inserted in the circuit and ground is applied to lead R through contacts DD–7 and resistor R4 to start the tone supply (option Z). Relay DD locks operated to ground through its own contacts DD–4 and operated contacts B–1. In addition, the operation of relay DD opens contacts DD–1 to open the timing circuit thus preventing a false cut-through.

When the subscriber hangs up, relay A releases, releasing relay B. The release of relay B opens contacts B–1 and releases relay DD thus restoring the diversion circuit.

If after seizure and before the operation of relay TM the subscriber hangs up, relay A is released, releasing relay B which in turn restores the diversion circuit to normal.

The circuit may also be equipped for peg count registration. On each operation of relay B and before operation of relay DD, ground is extended through operated contacts B–1 and released contacts DD–5 to lead TS to operate a total seizure register TS. On each operation of relay TM and before operation of relay CT, a ground is extended through operated contacts TM–2 and released contacts CT–5 to lead TCT to operate a total cut-through register. Peg count registers are commonly known in the art and need not be described in detail.

The above circuit may also be equipped for use with traffic usage recorders. The operation of relay CT will close contacts CT–6 and extend ground to operate a traffic usage recorder to record the usage of the associated information or repair trunk when a subscriber is cut through. The operation of relay DD closes contacts DD–6 to operate a traffic usage recorder to record the usage of the diversion circuit in the event of no cut through. The total usage of the diversion circuit can be obtained by adding both usage figures. Traffic usage recorders are commonly known and need not be described in detail.

We claim:

1. A diversion circuit, responsive to the reception of dialled pulses originating with an incoming call, for diverting calls, that are improperly made to an information or repair desk, to a tone supply, an announcement machine or an intercept trunk circuit, wherein an improperly made call contains more digits than a properly made call, comprising:

a. a timing circuit;

b. a first means responsive to seizure of the diversion circuit for energizing said timing circuit;

c. a second means responsive to said timing circuit for connecting a properly made call to the information or repair desk after a predetermined time interval; and d. a third means responsive to the reception of additional dialled pulses by the first means before the completion of the timing interval, for deenergizing said timing circuit and for diverting an improperly made call to a tone supply, an announcement machine or an intercept trunk circuit.

2. A diversion circuit as defined in claim 1 wherein said timing circuit comprises a gas tube in series with a timing relay, said gas tube having an anode and a cathode electrode in the energization path of the relay and a control electrode for firing the tube.

3. A diversion circuit as defined in claim 2 further including a capacitor connected across the control electrode and the cathode electrode and a circuit including a variable resistor for gradually charging said capacitor, said gas tube being rendered conductive when the voltage across the capacitor reaches a predetermined value.

4. A diversion circuit as defined in claim 1 wherein said first means comprises a first relay which becomes energized upon seizure of the diversion circuit and a second relay which becomes energized in response to energization of said first relay.

5. A diversion circuit as defined in claim 2 wherein said second means is a third relay which is responsive to energization of said timing relay.

6. A diversion circuit as defined in claim 3 wherein said third means is a fourth relay which is responsive to the release of the first relay upon reception of the first pulse.

7. A diversion circuit as defined in claim 2 further including means responsive to said timing relay for registering the number of connections to said information or repair desk.

8. A diversion circuit as defined in claim 4 further including means responsive to said second relay for registering the total number of seizures of the diversion circuit.

9. A diversion circuit as defined in claim 5 further including means responsive to said third relay for recording the number of connections to the information or repair desk.

10. A diversion circuit as defined in claim 6 further including means responsive to said fourth relay for recording the number of diverted calls.